(12) United States Patent
Rykowski

(10) Patent No.: US 9,135,851 B2
(45) Date of Patent: Sep. 15, 2015

(54) METHODS AND SYSTEMS FOR MEASURING AND CORRECTING ELECTRONIC VISUAL DISPLAYS

(71) Applicant: Radiant-Zemax Holdings, LLC, Redmond, WA (US)

(72) Inventor: Ronald F. Rykowski, Bellevue, WA (US)

(73) Assignee: Radiant Vision Systems, LLC, Redmond, WA (US)

( * ) Notice: Subject to any disclaimer, the term of this patent is extended or adjusted under 35 U.S.C. 154(b) by 0 days.

(21) Appl. No.: 14/458,695

(22) Filed: Aug. 13, 2014

(65) Prior Publication Data
US 2014/0347408 A1    Nov. 27, 2014

Related U.S. Application Data

(62) Division of application No. 13/830,678, filed on Mar. 14, 2013, now Pat. No. 8,836,797.

(51) Int. Cl.
| | |
|---|---|
| *H04N 17/00* | (2006.01) |
| *G09G 3/30* | (2006.01) |
| *G09G 3/00* | (2006.01) |
| *H04N 17/04* | (2006.01) |

(52) U.S. Cl.
CPC .................. *G09G 3/30* (2013.01); *G09G 3/006* (2013.01); *H04N 17/004* (2013.01); *H04N 17/04* (2013.01); *G09G 2320/0233* (2013.01); *Y10T 29/49004* (2015.01)

(58) Field of Classification Search
CPC . G09G 3/30; G09G 3/006; G09G 2320/0233; H04N 17/04; H04N 17/004; Y10T 29/49004

USPC ............... 348/189; 445/3, 4, 23, 24, 63, 66; 313/513, 514, 520; 345/77, 63, 82

See application file for complete search history.

(56) References Cited

U.S. PATENT DOCUMENTS

| | | | |
|---|---|---|---|
| 6,285,349 B1 | 9/2001 | Smith | |
| 6,618,076 B1 | 9/2003 | Sukthankar et al. | |
| 7,063,449 B2 * | 6/2006 | Ward | 362/616 |
| 7,518,623 B2 | 4/2009 | Dowling et al. | |
| 7,901,095 B2 | 3/2011 | Xiao et al. | |
| 8,344,659 B2 * | 1/2013 | Shimomura et al. | 315/307 |

(Continued)

FOREIGN PATENT DOCUMENTS

KR    20110056167 A    5/2011

*Primary Examiner* — Victor Kostak
(74) *Attorney, Agent, or Firm* — Perkins Coie LLP

(57) ABSTRACT

The present disclosure relates to methods and systems for measuring and correcting electronic visual displays. A method in accordance with one embodiment of the present technology includes generating a series of patterns for illuminating proper subsets of the light emitting elements of the display, such as regular grids of nonadjacent activated light emitting elements with the elements in between deactivated. For each generated pattern, an imaging device captures information about the activated light emitting elements. A computing device analyzes the captured information, comparing the output of the activated light emitting elements to target output values, and determines correction factors to calibrate the display to better achieve the target output values. In some embodiments, the correction factors may be uploaded to firmware controlling the display or used to process images to be shown on the display.

20 Claims, 7 Drawing Sheets

(56) References Cited

U.S. PATENT DOCUMENTS

| | | |
|---|---|---|
| 8,482,698 B2 * | 7/2013 | Atkins .............................. 349/61 |
| 8,564,879 B1 | 10/2013 | Eaton et al. |
| 2004/0213449 A1 | 10/2004 | Safaee-Rad et al. |
| 2005/0068466 A1 | 3/2005 | Waters et al. |
| 2006/0227085 A1 * | 10/2006 | Boldt et al. ...................... 345/83 |
| 2006/0284802 A1 * | 12/2006 | Kohno ............................ 345/76 |
| 2007/0103411 A1 * | 5/2007 | Cok et al. ........................ 345/82 |
| 2007/0291121 A1 | 12/2007 | Chuang et al. |
| 2008/0062164 A1 | 3/2008 | Bassi et al. |
| 2008/0085652 A1 * | 4/2008 | Winters ............................ 445/4 |
| 2008/0238931 A1 * | 10/2008 | Komiya et al. ................ 345/589 |
| 2008/0284690 A1 * | 11/2008 | Ko et al. ......................... 345/76 |
| 2010/0231603 A1 | 9/2010 | Kang |
| 2011/0032248 A1 | 2/2011 | Atkins |
| 2011/0069960 A1 * | 3/2011 | Knapp et al. .................. 398/103 |
| 2011/0109228 A1 | 5/2011 | Shimomura et al. |
| 2011/0227964 A1 | 9/2011 | Chaji et al. |
| 2011/0267365 A1 | 11/2011 | Kostal et al. |
| 2012/0300044 A1 | 11/2012 | Thomas et al. |
| 2013/0016082 A1 | 1/2013 | Coley et al. |
| 2013/0050504 A1 * | 2/2013 | Safaee-Rad et al. ........... 348/181 |
| 2013/0120330 A1 * | 5/2013 | Kang et al. .................... 345/207 |
| 2013/0147764 A1 | 6/2013 | Chaji et al. |

* cited by examiner

METHODS AND SYSTEMS FOR MEASURING AND CORRECTING ELECTRONIC VISUAL DISPLAYS

CROSS REFERENCE TO RELATED APPLICATION

This application is a divisional of U.S. application Ser. No. 13/830,678 filed Mar. 14, 2013, which is incorporated herein by reference in its entirety.

TECHNICAL FIELD

The present disclosure relates generally to electronic visual displays, and more particularly, to methods and systems for measuring and calibrating the output from such displays.

BACKGROUND

Electronic visual displays ("displays") have become commonplace. Displays of increasingly high resolution are used in a wide variety of contexts, from personal electronics with screens a few inches or smaller in size to computer screens and televisions several feet across to scoreboards and billboards covering hundreds of square feet. Some displays are assembled from a series of smaller panels, each of which may further consist of a series of internally connected modules. Virtually all displays are made up of arrays of individual light-emitting elements called "pixels." In turn, each pixel is made up of a plurality of light-emitting points (e.g., one red, one green, and one blue). The light-emitting points are termed "subpixels."

It is often desirable for a display to be calibrated. For example, calibration may improve the uniformity of the display and improve consistency between displays. During calibration of a display (or, e.g., of each module of a display), the color and brightness of each pixel or subpixel is measured. Adjustments are determined so the pixels can display particular colors at desired brightness levels. The adjustments are then stored (e.g., in software or firmware that controls the display or module), so that those adjustments or correction factors can be applied.

DETAILED DESCRIPTION

A. Overview

Figure 1:
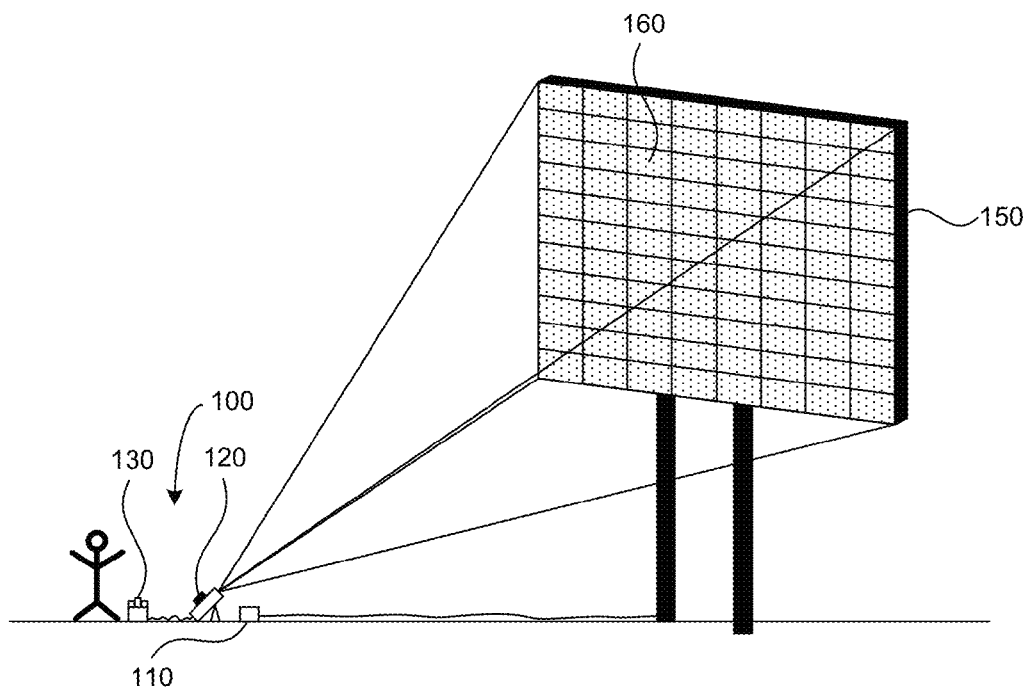
FIG. 1 is a schematic view of an electronic visual display calibration system configured in accordance with an embodiment of the disclosure.

The following disclosure describes electronic visual display calibration systems and associated methods for measuring and calibrating electronic visual displays. As described in greater detail below, a display measurement method and/or system configured in accordance with one aspect of the disclosure is configured to measure the luminance and the color of the individual pixels or subpixels of an electronic visual display, such as a high-resolution liquid crystal display ("LCD") or an organic light-emitting diode ("OLED") display.

The inventors have recognized that when pixels are very closely spaced, such as is typical in many LCDs, OLED displays, and high resolution light-emitting diode ("LED") displays, measuring individual pixel or subpixel attributes becomes more difficult. Accordingly, embodiments of the present technology use a pattern generator (e.g., standalone hardware test equipment, a logic analyzer add-on module, a computer peripheral, software in a computing device or controller connected to the display, output from a serial digital interface ("SDI"), digital video interface ("DVI") or high-definition multimedia interface ("HDMI") port, etc.) to display only a desired subset of pixels or subpixels to be measured. In some embodiments, for example, the pattern generator illuminates only every third or every fourth pixel of the display, such that the pixels between them remain off. The technology uses an imaging device (which typically has a considerably higher resolution than the display itself) to measure only the illuminated pixels (and/or subpixels). Because only a subset of the pixels are illuminated and measured at once, the display under test effectively has a much lower pixel resolution. After measuring the illuminated pixels, the pattern can then be shifted (e.g., by one pixel) and then measurements can be repeated until all of the pixel of the display have been measured.

In one particular embodiment, for example, if every fifth pixel of a 1,920×1,080 pixel high definition television ("HDTV") display is illuminated at a time, then the effective resolution is 384×216 pixels. To measure the illuminated pixels with an imaging device having a resolution about six times greater than the display's pixel resolution, a camera with a resolution of approximately 2,300×1,300—i.e., a camera readily available for a reasonable price—could potentially be used. In contrast with the present technology, however, many conventional approaches for analyzing the 1,920×1,080 pixel HDTV display would require a camera having a resolution of approximately 12,000×6,000, or 72,000,000 pixels. Such a camera (with resolution high enough for the display to be measured) is expected to be prohibitively expensive and/or unavailable. As a result, measuring and calibrating such displays using conventional techniques is often impractical and/or too expensive.

Another conventional approach for measuring such large or high-resolution displays is to divide the display (or its constituent panels or modules) into sections small enough that the imaging system has sufficient resolving power to enable an accurate measurement of the pixels or subpixels of each section. Using this approach, the imaging device (or the display being measured) is generally mounted on an x-y stage for horizontal and vertical positioning, or rotated to align to each section being measured. Moving or rotating either the camera or the display, however, requires additional, potentially expensive additional equipment, as well as time to perform the movement or rotation and to align the imaging device to the display. Furthermore, this technique can lead to slight mismatches or discontinuities of measurement between the individual sections. If the measurements are used for uniformity correction, such mismatches must be addressed, typically with further measurements and/or post-processing the display measurement data.

In contrast with conventional techniques, embodiments of the present technology are expected to enable precise measurement of individual pixel or subpixel output for any display (e.g., an OLED display) without requiring expensive, high resolution imaging devices, and without additional equipment for moving the relationship between the imaging device and the display, time for moving and aligning them, or mismatches between sections of the display.

Certain details are set forth in the following description and in FIGS. 1-6 to provide a thorough understanding of various embodiments of the disclosure. However, other details describing well-known structures and systems often associated with visual displays and related optical equipment and/or other aspects of visual display calibration systems are not set forth below to avoid unnecessarily obscuring the description of various embodiments of the disclosure.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

B. Embodiments of Electronic Visual Display Calibration Systems and Associated Methods for Calibrating Electronic Visual Displays FIG. 1 is a schematic view of an electronic visual display calibration system ("the system") 100 configured in accordance with an embodiment of the disclosure. The system 100 is configured to collect, manage, and/or analyze display data for the purpose of processing image patterns (e.g., static image patterns, video streams comprised of a series of image patterns, etc.) that are shown on an electronic visual display 150. The pattern 160 shown on the display 150 is generated by a pattern generator 110. The display 150 can be, for example, a large electronic display or sign composed of smaller panels or modules. The pattern 160 generated by the pattern generator 110 and displayed on the display 150 illustrated in FIG. 1 is described in further detail below in connection with FIGS. 4A-4B.

In the embodiment illustrated in FIG. 1, the system 100 includes a computing device 130 operably coupled to an imaging device 120 (e.g., an imaging colorimeter or other photometer). In the illustrated embodiment, the imaging device 120 is spaced apart from the display 150 (e.g., so that the entire display 150 is within the field of view of the imaging device 120, and, in the case of a large elevated sign, for improving the convenience of measurement) and configured to sense or capture display information (e.g., color data, luminance data, etc.) from selectively illuminated pixels or subpixels 160 of the display 150. For example, the pattern generator 110 can illuminate every nth pixel of the display 150. The captured display information is transferred from the imaging device 120 to the computing device 130. After capturing or otherwise sensing the display information for one pattern 160, the pattern generator 110 can generate additional patterns 160 on the display 150. For example, the pattern generator 110 can illuminate every next nth pixel of the display 150. This process can be repeated (e.g., n times) until the computing device 130 obtains display information for all the pixels or subpixels of the entire display 150. The computing device 130 is configured to store, manage, and/or analyze the display information from each pattern 160 to determine one or more correction factors for the display 150 or for its pixels or subpixels.

In some embodiments, the correction factors for the display 150 are applied to the firmware and/or software controlling the display 150 to calibrate the display 150. In alternate embodiments, the corrections are applied in real time to a video stream to be shown on the display 150. In such embodiments, the technology includes comparing the actual display value with a desired display value for the one or more portions of the display 150, and determining a correction factor for the pixels or subpixels of the display 150 as determined from the measurements of the patterns 160 described above. The technology processes or adjusts the image with the correction factors for the corresponding pixels of the display 150. After processing the image to account for variations in the display 150, the technology can further include transmitting the image to the display 150 and showing the image on the display 150. Accordingly, in some embodiments, the image on the display 150 can be presented according to the desired display values without modifying or calibrating the actual display 150.

One of ordinary skill in the art will understand that although the system 100 illustrated in FIG. 1 includes separate components (e.g., the pattern generator 110, the imaging device 120, and the computing device 130), in other embodiments the system 100 can incorporate more or less than three components. Moreover, the various components can be further divided into subcomponents, or the various components and functions may be combined and integrated. In addition, these components can communicate via wired or wireless communication, as well as by information contained in storage media. The various components and features of the electronic visual display calibration system 100 are described in greater detail below in connection with FIG. 3.

Figure 2:
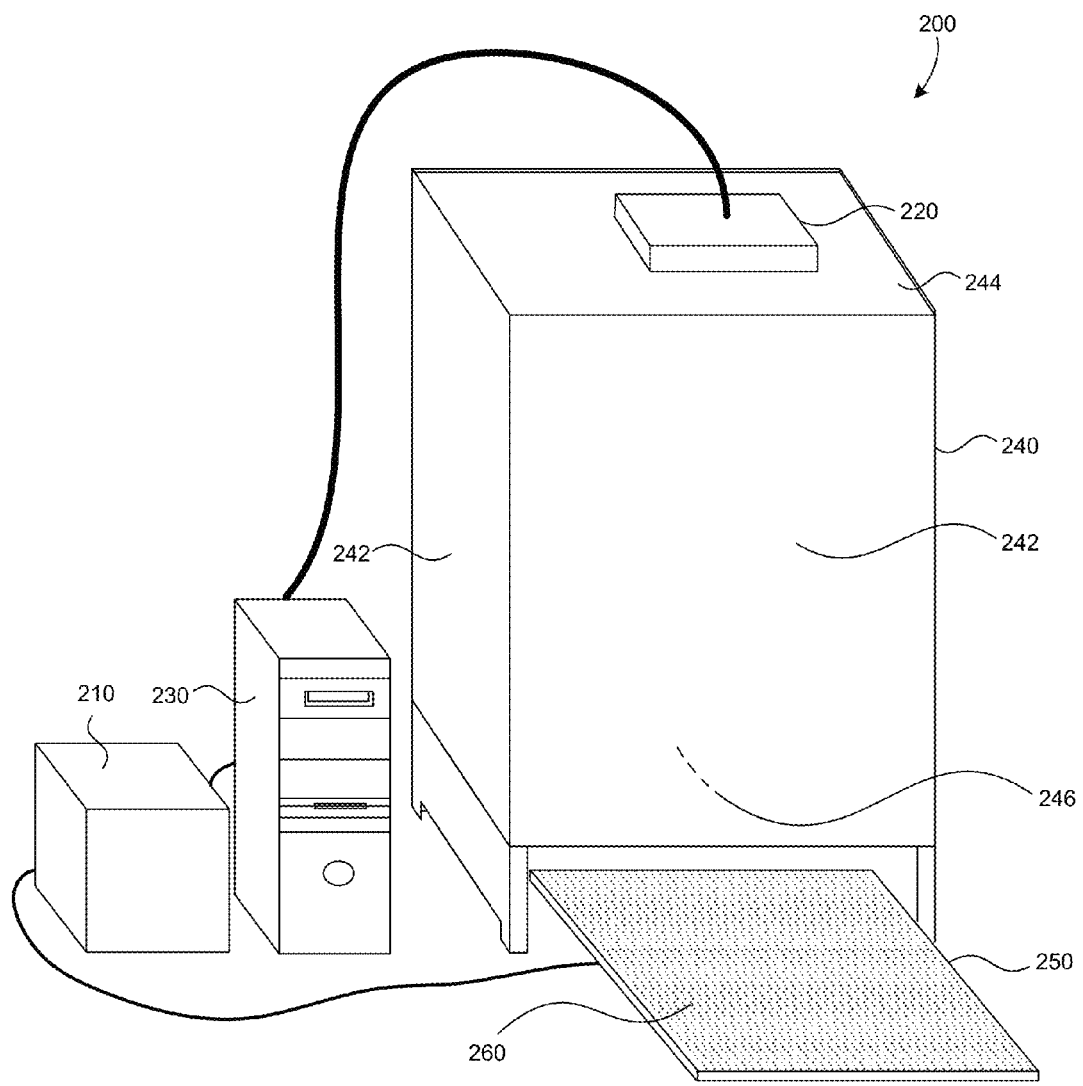
FIG. 2 is an isometric front view of an electronic visual display calibration system configured in accordance with an embodiment of the disclosure.

FIG. 2 is an isometric front view of an electronic visual display calibration system 200 configured in accordance with an embodiment of the disclosure. The system 200 is configured to perform correction of the brightness and color of light-emitting elements that are used in electronic visual displays. In one embodiment, the calibration system 200 can include a test pattern generator 210, a test station 240, an interface 230, and an electronic visual display 250. In the embodiment illustrated in FIG. 2, the calibration system 200 is designed to calibrate a display 250 that is placed within the test station 240. In alternate embodiments, it is possible to calibrate multiple displays or multiple panels of a larger display within the test station 240.

The test pattern generator 210 is configured to generate a series of test patterns 260, each of which illuminates a proper subset of the pixels or subpixels of the display 250. The test station 240 is configured to capture a series of images from an imaging area covering all of the display 250. The captured image data is transferred from the test station 240 to the interface 230. The interface 230 compiles and manages the image data, performs a series of calculations to determine the appropriate correction factors that should be made to the image data, and then stores the data. This process is repeated until images of each of the pixels or subpixels of display 250 have been obtained. After collection of all the necessary data, the processed correction data is then uploaded from the interface 230 to the firmware and/or software controlling the display 250 and used to recalibrate the display 250.

In the embodiment illustrated in FIG. 2, the test station 240 can include a lightproof chamber for calibrating a display 250 in a fully-illuminated room or factory. The test station 240 can include a digital camera 220 mounted on the top portion 244 of the test station 240. The test station 240 can further include light baffles to eliminate any stray light that might be reflected off the walls of the test station chamber 242 back into the camera 220. In the illustrated embodiment, the display 250 is positioned beneath the test station 240. The test station 240 includes mechanical and electrical fixtures for receiving the display 250 and placing it in position within the test station 240 for calibration. In other embodiments, the test station 240 may be in other orientations, e.g., facing upward at a display positioned above the test station or facing horizontally. Further, in some embodiments the test station 240 may have a different arrangement and/or include different features.

In the illustrated embodiment, the test station 240 also incorporates a ground glass diffuser 246 positioned just above the display 250. The diffuser 246 scatters the light emitted from each subpixel in the display 250, which effectively partially integrates the emitted light angularly. Accordingly, the camera 220 is actually measuring the average light emitted into a cone rather than only the light traveling directly from each subpixel on the display 250 toward the camera 220. One advantage of this arrangement is that the display 250 will be corrected to optimize viewing over a wider angular range. The diffuser 246 is an optional component that may not be included in some embodiments.

The interface 230 that is operably coupled to the test station 240 is configured to manage the data that is collected, stored, and used for calculation of new correction factors that will be used to recalibrate the display 250. The interface 230 automates the operation of the pattern generator 210 and the test station 240 and writes all the data into a database. In one embodiment, the interface 230 can be a personal computer with software for pattern selection, camera control, image data acquisition, and image data analysis. Optionally, in other embodiments various devices capable of operating the software can be used, such as handheld computers.

Figure 3:
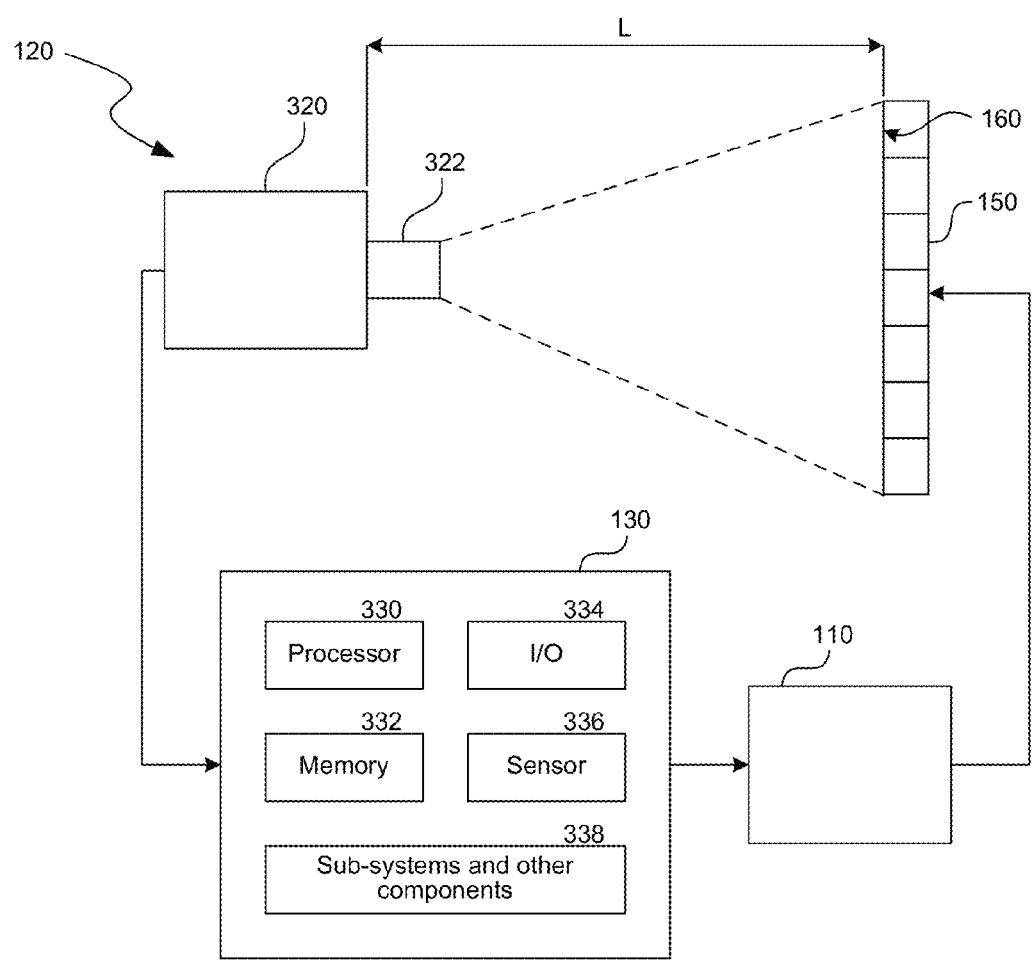
FIG. 3 is a schematic block diagram of the electronic visual display calibration system of FIG. 1.

FIG. 3 is a schematic block diagram of the electronic visual display calibration system 100 of FIG. 1. In the illustrated embodiment, the imaging device 120 can include a camera 320, such as a digital camera suitable for high-resolution imaging. For example, the camera 320 can include optics capable of measuring subpixels of the display 150 (which can be a few millimeters in size) from a distance of 25 meters or more. If the displayed pattern 160 does not illuminate adjacent subpixels or pixels, imaging resolution requirements for the camera 320 may be less stringent, allowing the use of a less expensive imaging device 120. In some embodiments, the camera 320 can be a CCD camera. Suitable CCD digital color cameras include ProMetric® imaging colorimeters and photometers, which are commercially available from the assignee of the present disclosure, Radiant Zemax, LLC, of Redmond, Wash. In other embodiments, the camera 320 can be a complementary metal oxide semiconductor ("CMOS") camera, or another type of suitable camera for imaging with sufficient resolution at a certain distance from the display.

According to another aspect of the illustrated embodiment, the imaging device 120 can also include a lens 322. In one embodiment, for example, the lens 322 can be a reflecting telescope that is operably coupled to the camera 320 to provide sufficiently high resolution for long distance imaging of the display 150. In other embodiments, however, the lens 322 can include other suitable configurations for viewing and/or capturing display information from the display 150. Suitable imaging devices 320 and lenses 322 are disclosed in U.S. Pat. Nos. 7,907,154 and 7,911,485, both of which are incorporated herein by reference in their entireties.

The imaging device 120 can accordingly be positioned at a distance L from the display 150. The distance L can vary depending on the size of the display 150, and can include relatively large distances. In one embodiment, for example, the imaging device 120 can be positioned at a distance L that is generally similar to a typical viewing distance of the display 150. In a sports stadium, for example, the imaging device 120 can be positioned in a seating area facing toward the display 150. In other embodiments, however, the distance L can be less that a typical viewing distance and direction, and the imaging system 120 can be configured to account for any viewing distance and/or direction differences. In some embodiments, the imaging device 120 has a wide field of view and the distance L can be less than the width of the display 150 (e.g., approximately one meter for a typical HDTV display). In other embodiments, the imaging device 120 has a long-focus lens 322 (e.g., a telephoto lens) and the distance L can be significantly greater than the width of the display 150 (e.g., between approximately 100 and 300 meters for an outdoor billboard or video screen). In yet other embodiments, the distance L can have other values.

The computing device 130 is configured to cause the pattern generator 110 to send images 160 (e.g., pixel or subpixel patterns) to the display 150. In various embodiments, the pattern generator 110 is standalone hardware test equipment, a logic analyzer add-on module, a computer peripheral operably coupled to the computing device 130, or software in the computing device 130 or in a controller connected to the display 150. In other embodiments, the pattern generator 110 operates independently of the computing device 130. In alternative embodiments, the patterns 160 are provided to the display 150 via standard video signal input, e.g., using a DVI, HDMI, or SDI input to the display. The patterns 160 generated by the pattern generator 110 for displaying on the electronic visual display 150 are discussed in greater detail in connection with FIGS. 4A and 4B below.

Continuing with respect to FIG. 3, the computing device 130 is configured to receive, manage, store, and/or process the display data collected by the imaging device 120 (e.g., for the purpose of adjusting the appearance of images 160 that will be displayed on the display 150). In other embodiments, display data associated with the display 150, including correction factors and related data, can be processed by a computer that is separate from the imaging device 120. A typical display 150, such as a quad extended graphics array ("QXGA")-resolution (2048×1536) visual display for example, can have over nine million subpixels that provide display data for the computing device 130 to manage and process. The pattern generator 110 may illuminate only a fraction of those subpixels at any one time, but by sending a series of patterns 160 to the display 150, information about all the subpixels will be delivered to the computing device 130. As such, the computing device 130 includes the necessary hardware and corresponding software components for managing and processing the display data. More specifically, the computing device 130 configured in accordance with an embodiment of the disclosure can include a processor 330, a memory 332, input/output devices 334, one or more sensors 336 in addition to sensors of the imaging device 120, and/or any other suitable subsystems and/or components 338 (displays, speakers, communication modules, etc.). The memory 332 can be configured to store the display data from the patterns 160 shown on the display 150. The computing device 130 includes computer readable media (e.g., memory 332, disk drives, or other storage media, excluding only a transitory, propagating signal per se) including instructions or software stored thereon that, when executed by the processor 330 or computing device 130, cause the processor 330 or computing device 130 to process an image as described herein. Moreover, the processor 330 can be configured for performing or otherwise controlling calculations, analysis, and any other functions associated with the methods described herein.

In some embodiments, the memory 332 includes software to control the imaging device 120 as well as measurement software to identify portions of the display 150 (e.g., subpixels of the display 150) and to image or otherwise extract the display data (e.g., subpixel brightness data, pixel color data, etc.). One example of suitable software for controlling the imaging device 120 and/or acquiring the display data is VisionCAL™ screen correction software, which is commercially available from the assignee of the present disclosure, Radiant Zemax, LLC, of Redmond, Wash. In other embodiments, other suitable software can be implemented with the system 100. Moreover, the memory 332 can also store one or more databases used to store the display data from the patterns 160 shown on display 150, as well as calculated correction factors for the display data. In one embodiment, for example, the database is a Microsoft Access® database designed by the assignee of the present disclosure. In other embodiments, however, the display data is stored in other types of databases or data files.

Figure 4A:
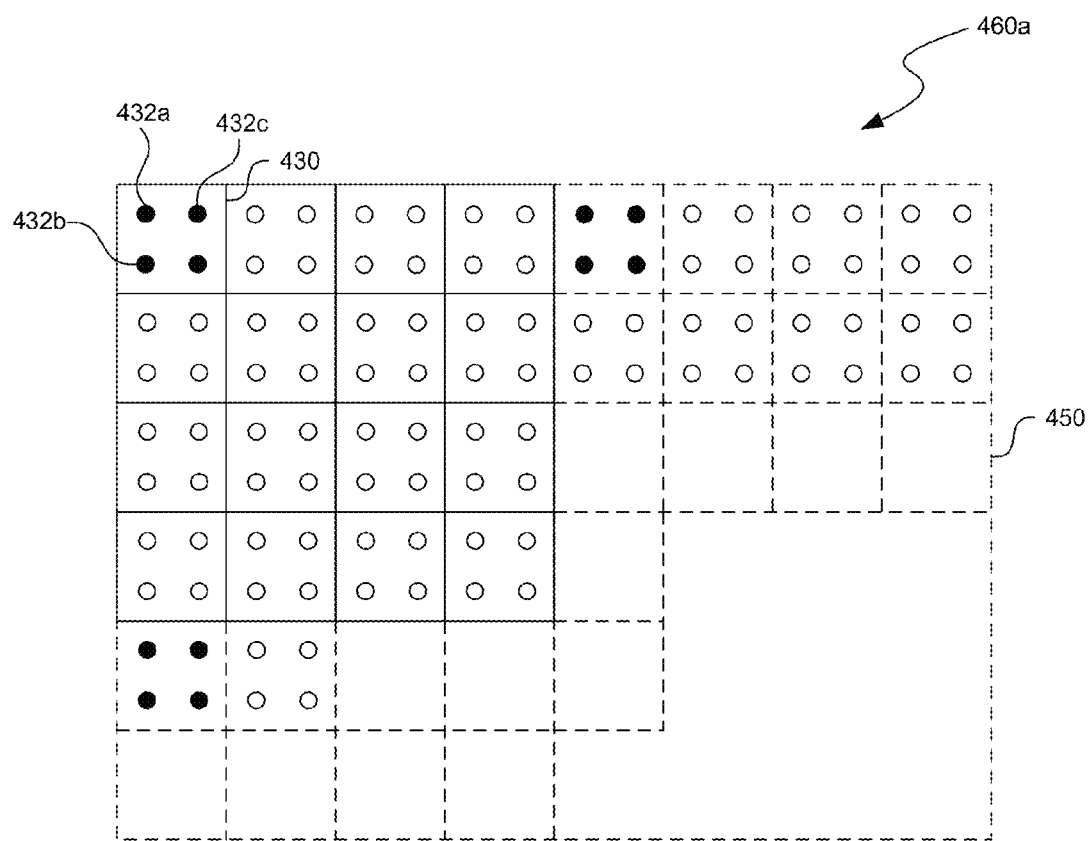
FIGS. 4A and 4B are enlarged partial front views of a portion of an electronic visual display configured to be used with embodiments of the disclosure.

FIG. 4A is an enlarged partial front view of a portion of an electronic visual display 450 configured to be used with embodiments of the disclosure. The illustrated view is representative of a portion of a display 450 (e.g., display 150 (FIG. 1) or display 250 (FIG. 2)) displaying a pattern 460a. The display 450 is made up of a large number (e.g., millions) of individual light sources or light-emitting elements or pixels 430. Each pixel 430 comprises multiple light-emitting points or subpixels 432 (identified as first, second, and third subpixels 432a-432c, respectively). In certain embodiments, the subpixels 432 are LEDs or OLEDs. For example, the subpixels 432a-432c can correspond to red, green, and blue LEDs, respectively. In other embodiments, each pixel 430 can include more or less than three subpixels 432. For example, some pixels 430 may have four subpixels 432 (e.g., two green subpixels, one blue subpixel, and one red subpixel, or other combinations). Pixels and subpixels may be laid out in various geometric arrangements (e.g., triangular or hexagonal arrays in various color orders, vertical or oblique stripes, etc.). Furthermore, in certain embodiments, the red, green, and blue ("RGB") color space may not be used. Rather, a different color space can serve as the basis for processing and display of color images on the display 450. For example, the subpixels 432 may be cyan, magenta, and yellow, respectively.

Figure 5:
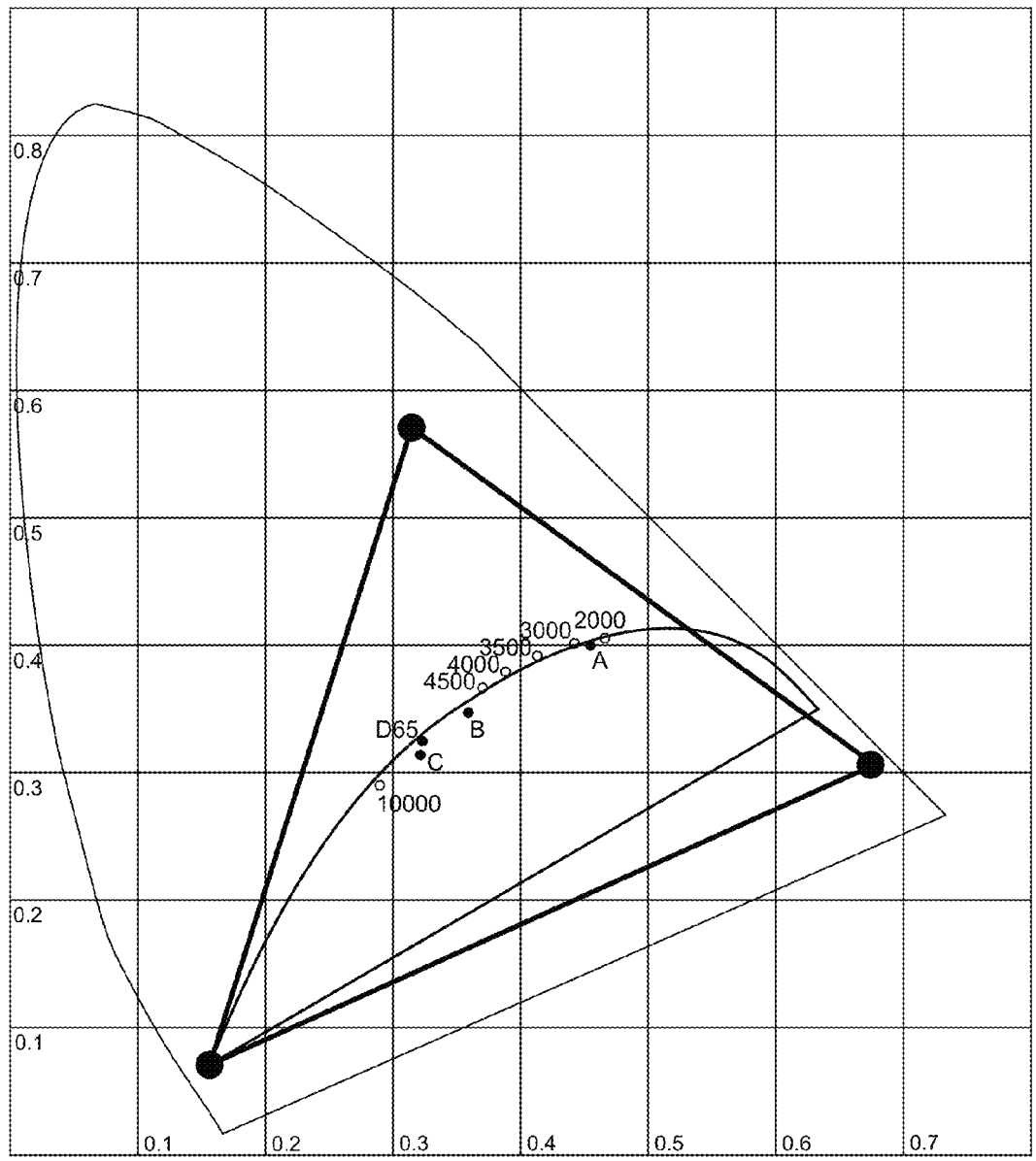
FIG. 5 is a diagram of a color gamut triangle.

In addition to the color level of each subpixel 432, the luminance level of each subpixel 432 can vary. Accordingly, the additive primary colors represented by a red subpixel, a green subpixel, and a blue subpixel can be selectively combined to produce the colors within the color gamut defined by a color gamut triangle, as shown in FIG. 5. For example, when only "pure" red is displayed, the green and blue subpixels may be turned on only slightly to achieve a specific chromaticity for the red color.

In addition, the measurement process described herein may be performed at various brightness levels. For example, in some embodiments, each pixel 430 or subpixel 432 is measured at input levels (using values from 0 to 255) of 255 (full brightness), 128 (one half brightness), 64 (one quarter brightness), and 32 (one eighth brightness). Data from such measurements can be used in calibration to achieve the same chromaticity for a particular color at various input brightness levels, or, e.g., to improve the uniformity of color and luminance response curves for each pixel or subpixel.

Returning to FIG. 4A, an illustrative pattern 460a illuminates a proper subset of the pixels of the display 450. In the illustrated embodiment, every fourth pixel 430 vertically and every fourth pixel 430 horizontally is illuminated, and the pixels between are switched off. Thus, for the illustrated pattern 460a, only one of every sixteen pixels 430 is illuminated, and the spaces between illuminated pixels are four times larger in each direction than there would be if every pixel 430 were illuminated. As a result, the effective pixel density of the display 450 is one sixteenth of the actual pixel density. For example, if pattern 460a is displayed on a "4K Ultra HD" television display 450 having a screen resolution of 3,840×2,160 pixels (a total of approximately 8.3 million pixels ("megapixels")), only (3,840/4)×(2,160/4) pixels, i.e., 960×540 pixels (a total of approximately five hundred thousand pixels (half a megapixel)) are lit at once. Such a reduction in the effective pixel resolution of the display 450 can permit use of imaging equipment (e.g., a camera sensor and lens) that is less sophisticated and expensive than would otherwise be required to measure the display 450.

Figure 4B:
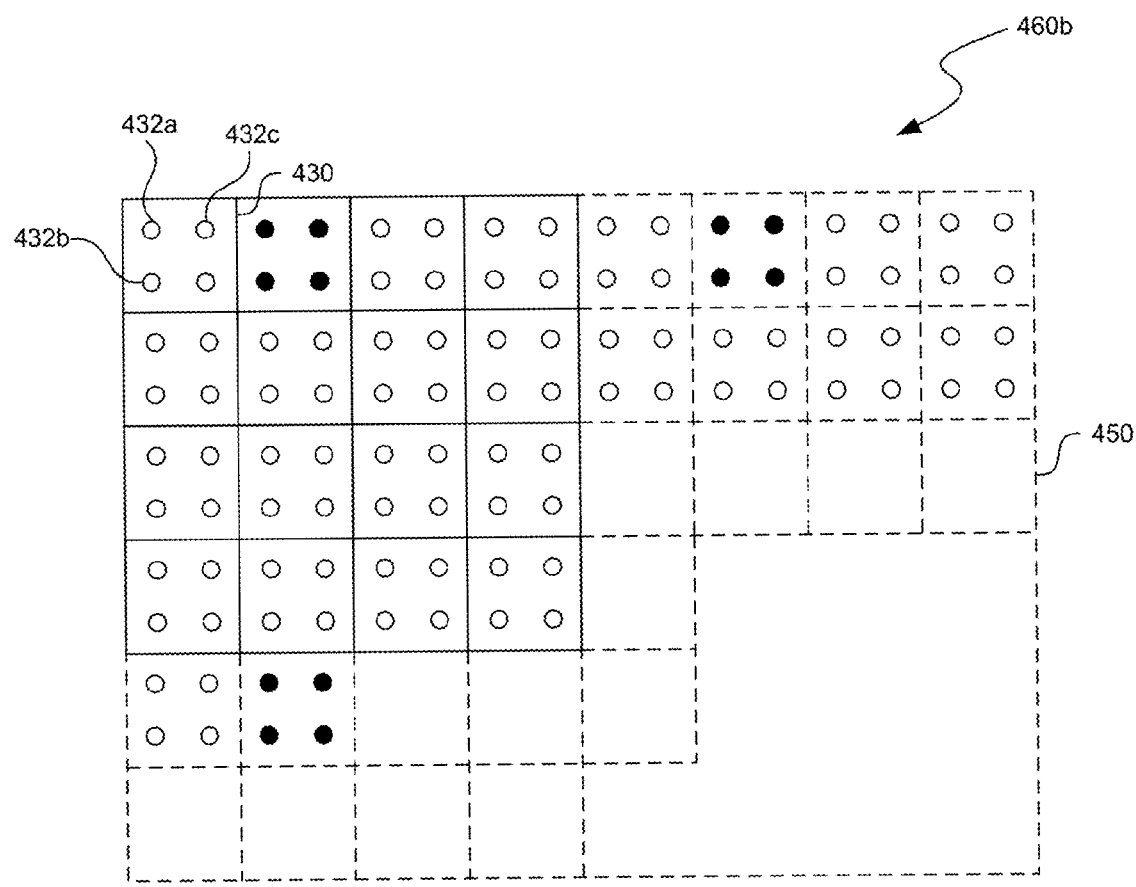

The technology displays a series of patterns to illuminate and measure each pixel or subpixel of the display at least once (and potentially multiple times, e.g., at different brightness input levels). FIG. 4B illustrates another pattern 460b on the same enlarged partial front view of a portion of the electronic visual display 450. In the pattern 460b of FIG. 4B, each pixel 430 that was illuminated in the pattern 460a of FIG. 4A is switched off, and the next pixel to the right is illuminated. In the illustrated embodiment, measuring the output of each pixel 430 of the display 450 requires displaying and measuring a total of sixteen patterns (multiplied by the number of different brightness levels for each pattern). Different patterns 460 of pixels 430 and/or subpixels 432 could require a smaller or larger number of patterns 460 to ensure full coverage of the display 450. For example, a pattern that illuminates every third pixel 430 horizontally and vertically requires nine patterns to cover every pixel 430 in the display 450.

In alternative embodiments, the patterns 460 illuminate individual subpixels 432 (e.g., one or more at a time of subpixels 432a-432c) rather than whole pixels 430. In various embodiments, the patterns 460 are displayed and measured at more than one brightness level. Separately illuminating each subpixel 432 and measuring individual pixels or subpixels at different brightness levels correspondingly multiplies the number of required measurements. In some embodiments, patterns are tailored to a particular display or a particular measurement. The patterns are not necessarily as regular or evenly distributed as the examples illustrated in FIGS. 4A-4B, and different patterns may illuminate different numbers of pixels or subpixels.

In addition to color and/or luminance, the subpixels 432 may have other visual properties that can be measured and analyzed in accordance with embodiments of the present disclosure. Moreover, although the displayed patterns 460 are described above with reference to pixels 430 and subpixels 432, other embodiments of the disclosure can be used with displays having different types of light emitting elements or components.

Figure 6:
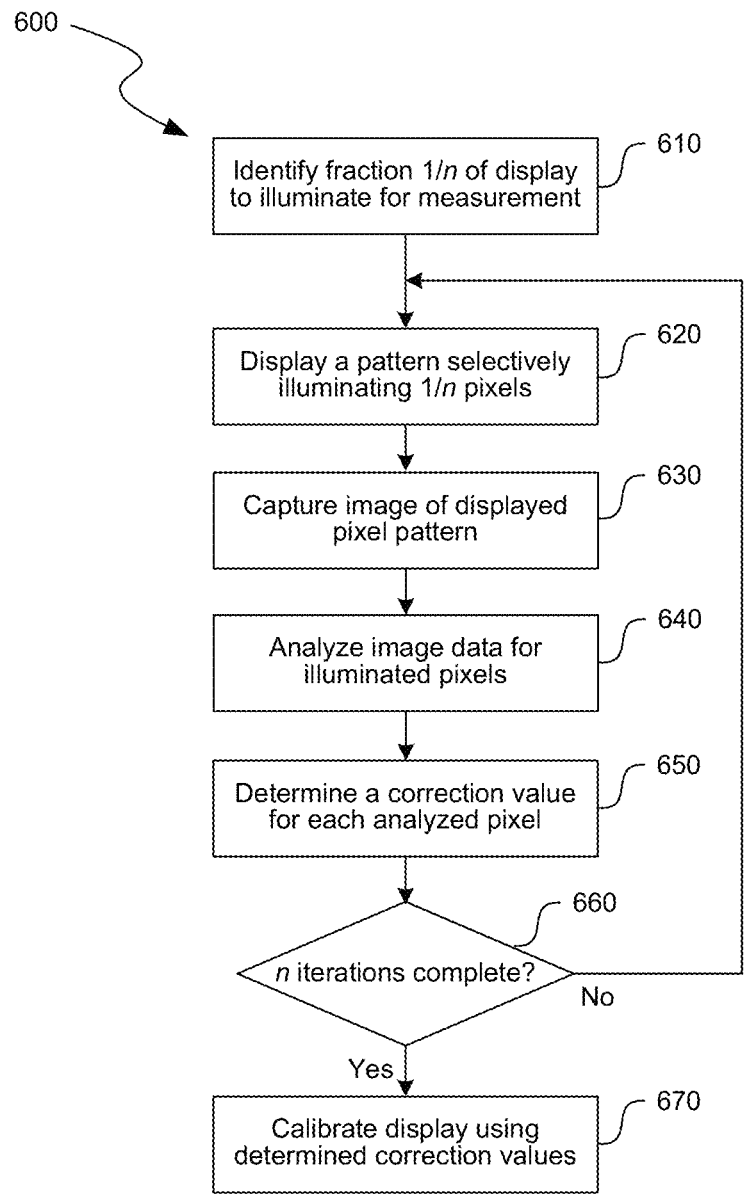
FIG. 6 is a flow diagram of a method or process configured in accordance with an embodiment of the disclosure.

FIG. 6 is a flow diagram of a method or process 600 configured in accordance with an embodiment of the disclosure. At block 610, the method includes identifying a fraction 1/n of the pixels or subpixels of the display to be illuminated for measurement. In some embodiments, the technology receives the number, e.g., from user input or from a configuration file. In some embodiments, the technology determines a number based on a heuristic and the characteristics of the display to be measured and the measuring equipment. Such characteristics may include, e.g., the size of the display, the pixel resolution of the display, the pixel density or dot pitch (i.e., distance between pixels) of the display, the distance from the display to the imaging device, the optical resolving power or angular resolution of the imaging device, and the pixel resolution of the imaging device. An example heuristic is that the pixel resolution of the imaging device is such that 50 pixels on the imaging device correspond to one illuminated subpixel on the display.

By way of example, in one embodiment the imaging device has a pixel resolution of 3,072×2,048=6,291,456 pixels. According to the heuristic that fifty pixels of resolution from the imaging device correspond to one subpixel on the display, the imaging device can capture data from 125,829 subpixels on the display (6,291,456 camera pixels/50 camera pixels per display subpixel) in a single captured image. In other embodiments, the correlation between the resolution of the imaging device and the display can vary between, e.g., 6 to 200 pixels on the imaging device corresponding to one subpixel on the display. Assuming, for example, that no other characteristic of the imaging device or its relationship to the display restricts its ability to measure the display, then the technology can determine the appropriate fraction 1/n in this case by dividing 125,829 (the number of subpixels to be illuminated in each captured image) by the total number of subpixels in the display. For example, to measure a display having a pixel resolution of 1,280×720=921,600 pixels, the fraction 1/n would be 125,829/921,600=1/7.324 or (rounding the denominator up) 1/8. In other words, if 1/8 of the display's subpixels are illuminated, the total number of illuminated subpixels will be below the threshold of 125,829 subpixels that can be captured in a single image by the selected imaging device in accordance with the applicable heuristic.

At block 620, the technology displays a pattern selectively illuminating 1/n of the pixels or subpixels of the display (e.g., in the example above, 1 of every 8 subpixels of the display). For example, every nth pixel (or subpixel of a particular color) may be illuminated. An example of such a pattern is described above in connection with FIG. 4A. As described above, the technology may illuminate each pixel or subpixel at various brightness levels. At block 630, the imaging device captures at least one image of the pattern of pixels or subpixels illuminated on the display. Each subpixel captured by the imaging device can be characterized, e.g., by its color value, typically expressed as chromaticity (Cx, Cy), and its brightness, typically expressed as luminance Lv. At block 640, the captured image data is analyzed by a computing device, e.g., the computing device described above in connection with FIGS. 1 and 3.

In some embodiments, the computing device compares the color and brightness of each captured pixel with target color and brightness values, e.g., points within the color gamut defined by a color gamut triangle, such as shown in FIG. 5. The actual pixel or subpixel color or brightness values may differ from desired or target display values for the display. For example, there is typically significant variation in color or luminance of each subpixel of the display, especially if the subpixels are LEDs or OLEDs. Moreover, over time the visual properties of the display may degrade or otherwise vary from desired or target display values. Accordingly, at block 650, the technology compares actual captured and analyzed values with target or desired display values for the pixels or subpixels illuminated according to the displayed pattern, and determines a correction value applicable to each analyzed pixel or subpixel.

Determining the correction values can include creating a correction data set or map. In some embodiments, the computing device calculates a three-by-three matrix of values for each pixel that indicate some fractional amount of power to turn on each subpixel to obtain each of the three primary colors (red, green, and blue) at target color and brightness levels. A sample matrix is displayed below:

| Fractional values for each subpixel of a pixel | | | |
|---|---|---|---|
| Primary color | Red | Green | Blue |
| Red | 0.60 | 0.10 | 0.05 |
| Green | 0.15 | 0.70 | 0.08 |
| Blue | 0.03 | 0.08 | 0.75 |

For example, according to the above matrix for a particular brightness level, when a pixel of the display should be red, the technology has calculated that the display should turn on its red subpixel at 60% power, its green subpixel at 10% power, and its blue subpixel at 5% power.

The determination of the correction values is based, at least in part, on the comparison between the captured and analyzed values and the target values for the display. More specifically, each correction factor can compensate for the difference between the captured and analyzed values and the corresponding target display value. For example, if the captured and analyzed value is less bright than the corresponding target display value, the correction factor can include the amount of brightness that would be required for the captured and analyzed value of the pixel or subpixel to be generally equal to the target display value. Moreover, the correction factor can correlate to the corresponding type of display value. For example, the correction value can be expressed in terms of color or brightness correction values, or in terms of other visual display property correction values. Suitable methods and systems for determining correction values or correction factors are disclosed in U.S. Pat. Nos. 7,907,154 and 7,911,485 referenced above.

At block 660, the process branches depending on whether or not all the pixels or subpixels of the display have been illuminated, captured, analyzed, and corrected as described above in blocks 620-650. If the technology illuminates a fraction 1/n of the pixels or subpixels of the display in each pattern, then at least n iterations are required to measure and calibrate the entire display. For example, after displaying a first pattern such as the pattern described above in connection with FIG. 4A, in which every nth pixel (or subpixel of a particular color) is illuminated, the technology returns to block 620. At block 620, the technology illuminates a different pattern of pixels or subpixels, e.g., a distinct subset of the pixels or subpixels of the display. For example, the technology might next display the pattern described above in connection with FIG. 4B, in which the next neighbor of every nth pixel (or subpixel of a particular color) is illuminated. The process then continues as described above.

After n iterations have been completed, at block 670, the method 600 can further include sending the calibration correction values to the display. In some embodiments, the correction factors are stored in firmware within the display or a controller of the display. In some embodiments, the correction factor data set or map can be saved and, e.g., provided to a third party such as the owner of the display, or used to process video images outside the display such that the display can show the processed image according to desired or target display properties without calibrating or adjusting the display itself Suitable methods and systems for correcting images to calibrate their appearance on a particular display are disclosed in U.S. patent application Ser. No. 12/772,916, filed May 3, 2010, entitled "Methods and systems for correcting the appearance of images displayed on an electronic visual display," which is incorporated herein in its entirety by reference. In some embodiments, the technology verifies or improves the calibration by measuring the calibrated output of each pixel or subpixel as described in blocks 610-660 above, and optionally modifying the correction factors applied to the display.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited, except as by the appended claims.

I claim:

1. A method of manufacturing an electronic visual display, the method comprising:
assembling an electronic visual display comprising an array of light emitting elements;
for each of a plurality of patterns of activated and deactivated light emitting elements:
activating a proper subset of the light emitting elements of the display according to the pattern;
measuring the light output of the activated light emitting elements;
comparing the light output measurements to target light output values; and
determining corrections for the activated light emitting elements to better achieve the target light output values; and
applying the determined corrections to calibrate the display.

2. The method of claim 1 wherein, in a pattern of activated and deactivated light emitting elements, substantially all of the individual activated light emitting elements are nonadjacent.

3. The method of claim 1 wherein each pattern comprises a distinct set of nonadjacent activated light emitting elements.

4. The method of claim 1 wherein a pattern comprises activated light emitting elements that are substantially evenly distributed across the display.

5. An electronic visual display manufactured in accordance with the method of manufacture of claim 1.

6. The electronic visual display of claim 5 wherein the display is a television, an LED display, or an OLED display.

7. The method of claim 1, further comprising:
providing an image capture device that is separate from the display; and
wherein measuring the light output of the activated light emitting elements is performed via the image capture device.

8. The method of claim 1 wherein the array of light emitting elements has a number of light emitting elements, and wherein the method further comprises:
identifying a fraction of the number of light emitting elements of the display; and
generating the patterns of activated and deactivated light emitting elements, such that—
each pattern illuminates the identified fraction of the number of light emitting elements of the display, and
each of the light emitting elements of the display is illuminated in at least one pattern.

9. The method of claim 8 wherein identifying a fraction of the number of light emitting elements of the display comprises:
determining characteristics of the display; and
calculating the fraction based on the characteristics.

10. The method of claim 9 wherein the display has a display resolution, and an image capture device for measuring the light output of the activated light emitting elements has an image capture device resolution, and wherein—
determining characteristics of the display comprises determining a ratio between the display resolution and the image capture device resolution; and
calculating the fraction based on the characteristics comprises choosing a portion of the number of light emitting elements of the display to be illuminated, such that the resolution of illuminated light emitting elements on the display is less than the image capture device resolution.

11. The method of claim 1 wherein measuring the light output of the activated light emitting elements includes measuring, via an image capture device, each of the activated light emitting elements, such that the light output measurements include distinct information about individual light emitting elements activated according to the pattern.

12. The method of claim 1, further comprising providing a testing station configured to receive at least a portion of the display being measured and to substantially minimize ambient light.

13. The method of claim 12 wherein the testing station includes a light baffle.

14. The method of claim 12 wherein the testing station includes a diffuser.

15. A method of manufacturing an electronic visual display, the method comprising:
providing a display test station configured to receive an electronic visual display including a plurality of light emitting elements and a display controller,
wherein the test station includes an image capture device;
receiving an electronic visual display in the display test station;
causing the electronic visual display to display a series of pattern images,
wherein—
each pattern image illuminates a proper subset of the plurality of light emitting elements; and
the series of pattern images illuminates substantially all of the plurality of light emitting elements;
capturing information about the illuminated light emitting elements via the image capture device;
determining correction factors for the light emitting elements based on the captured information; and
applying the correction factors to the display controller to calibrate the electronic visual display.

16. The method of claim 15 wherein the image capture device is an imaging colorimeter.

17. The method of claim 15 wherein each pattern comprises a regular grid of nonadjacent illuminated light emitting elements.

18. The method of claim 15 wherein causing the electronic visual display to display a series of pattern images further comprises illuminating the light emitting elements at more than one brightness level.

19. The method of claim 15 wherein capturing information about the illuminated light emitting elements via the image capture device comprises:
locating and registering the illuminated light emitting elements; and
determining a chromaticity value and a luminance value for each registered light emitting element.

20. The method of claim 15 wherein determining correction factors for the light emitting elements based on the captured information comprises:
   converting the chromaticity value and the luminance value for each registered light emitting element to measured tristimulus values;
   determining target tristimulus values; and
   calculating correction factors for the registered light emitting elements based on the measured tristimulus values and the target tristimulus values.

* * * * *

UNITED STATES PATENT AND TRADEMARK OFFICE
CERTIFICATE OF CORRECTION

| | |
|---|---|
| PATENT NO. | : 9,135,851 B2 |
| APPLICATION NO. | : 14/458695 |
| DATED | : September 15, 2015 |
| INVENTOR(S) | : Ronald F. Rykowski |

Page 1 of 1

It is certified that error appears in the above-identified patent and that said Letters Patent is hereby corrected as shown below:

IN THE SPECIFICATION

In column 6, line 2, delete "less that" and insert -- less than --, therefor.

In column 10, line 60, delete "itself" and insert -- itself. --, therefor.

Signed and Sealed this
Fifteenth Day of March, 2016

Michelle K. Lee
*Director of the United States Patent and Trademark Office*